United States Patent Office 3,070,581
Patented Dec. 25, 1962

3,070,581
PROCESS FOR THE PREPARATION OF ORGANIC PHOSPHORUS- AND SULFUR - CONTAINING COMPOSITIONS
Clark O. Miller, Willoughby, Ohio, assignor to The Lubrizol Corporation, Wickliffe, Ohio, a corporation of Ohio
No Drawing. Filed Feb. 25, 1960, Ser. No. 10,850
9 Claims. (Cl. 260—79.5)

This invention relates to the preparation of phosphorus- and sulfur-containing compositions, and in a more particular sense to a process for preparing such compositions from aliphatic olefin polymers.

The treatment of hydrocarbons with phosphorus- and sulfur-containing reagents is well-known in the art. The products of such treatment are organic compositions containing phosphorus and sulfur. They are useful for a great variety of purposes, including for example as insecticides, rust-inhibiting agents, ore-flotation agents, etc. A particularly important embodiment of such treatment is the incorporation of phosphorus and sulfur into polymeric hydrocarbon substances of intermediate or high molecular weights, e.g., 300 or higher. The products derived from such hydrocarbons are readily converted by hydrolysis to acidic intermediates which may then be treated with inorganic metal bases to produce neutral or basic metal salts. The metal salts have found wide-spread use as detergent additives in hydrocarbon oil compositions such as gasolines, fuel oils, lubricating oils, etc. When employed for this purpose, the metal salts depend for their commercial utility largely upon their relative metal content. Thus it is known that an additive having a higher metal content will be more effective than an otherwise similar additive having a lower metal content. It will be readily appreciated also that a lesser amount of the additive having a higher metal content will be needed to achieve a desired result. This latter advantage is an obviously important economic factor which determines the commercial utility of the additives.

It is apparent therefore that phosphorus- and sulfur-containing compositions which are capable of solubilizing large amounts of metal are highly desirable as intermediates for preparing metal-containing detergent additives for use in hydrocarbon oils. Accordingly, it is an object of this invention to provide a process for preparing phosphorus- and sulfur-containing compositions.

It is also an object of this invention to provide a process for preparing phosphorus- and sulfur-containing compositions which are capable of sustaining the solubility of large amounts of metal.

It is another object of this invention to provide a process for preparing metal salts of organic phosphorus- and sulfur-containing compositions derived from aliphatic olefin polymers.

These and other objects are attained in accordance with this invention by providing a process for preparing phosphourus- and sulfur-containing compositions which comprises preparing a mixture of white phosphorus and an aliphatic olefin polymer having a molecular weight of at least about 250 and heating said mixture at a temperature above about 140° C. with from about one to about two moles of sulfur chloride per mole of white phosphorus. The products of the above process contain phosphorus, sulfur and a small amount of chlorine. They are in most cases liquids, although the use in the process of a high molecular weight aliphatic olefin polymer reactant will result in the formation of an amorphous, rubbery material. In one preferred embodiment of the process an aliphatic polymer of isobutene having a molecular weight within the range of from about 500 to about 3,000 is used to produce a liquid product. The chlorine is reactive and is readily removed by hydrolysis. Hydrolysis removes also a large proportion of the sulfur from the products. The phosphorus, however, is more stably bound to the hydrocarbon chains of the olefin polymer and remains in the polymer molecule even after treatment of the product with steam. The products of hydrolysis are organic phosphorus acids, more specifically, a mixture of phosphorus acids characterized by having at least one carbon-to-phosphorus linkage in their molecules. The phosphorus- and sulfur-containing compositions obtained by the above process, as well as the hydrolyzed products thereof, are also susceptible to further modification by treatment with alcohols, mercaptans, phenols, amino-compounds, metal bases, etc. The products of such modification are, for example, esters, amides, salts, and the like.

The process of this invention is best carried out by mixing the white phosphorus with the olefin polymer, adding the sulfur chloride to the mixture and heating the reaction mass to a temperature above about 140° C. but below the decomposition point of the mass. A minimum temperature of 140° C. is apparently required to cause the desired reaction to take place at a reasonable rate. The preferred temperatures for this process usually range between 160° C. and 250° C. the upper temperature being representative of a practical temperature limit. Higher temperatures such as 300° C. or even higher may be employed but they do not appear to have any beneficial effects. Although the mixing of the three reactants in most cases is exothermic, external heating is usually required to maintain the reaction temperature within the limits set forth above. The process may be carried out in the absence of a diluent or solvent, but ordinarily an inert solvent such as mineral oil is preferably employed to facilitate intimate mixing of the reaction components and temperature control.

Only white phosphorus, also known as yellow phosphorus, is useful in the process of this invention. Red phosphorus is apparently not reactive with the olefin polymer under the herein described process conditions and accordingly is not contemplated for use in this invention.

As indicated previously, aliphatic olefin-polymers having molecular weights of 250 or higher are susceptible to modification by this process. Such polymers include principally the polymers of lower mono-olefins such as ethylene, propene, isobutene, n-butene, or pentene. They include also interpolymers of such mono-olefins with minor amounts of interpolymerizable aliphatic diolefins or higher olefins such as hexene, vinyl cyclohexane, butadiene, isoprene, etc., insofar as such interpolymerizable units do not exceed about 5–10% by weight of the lower mono-olefinic units in the polymeric products. Specific examples of such interpolymers are: polymer of 95% by weight of isobutene with 5% by weight of vinyl cyclohexane, polymer of 99% by weight of propene with 1% by weight of butadiene, polymer of 98% by weight of isobutene with 1% by weight of isoprene and 1% by weight of piperylene, etc.

The molecular weights of the polymeric reactants usually range from about 250 to 50,000 or even higher. The preferred molecular weights are for the most part in the neighborhood of 500–3,000. Polymers of molecular weights lower than 250 are not contemplated for use herein for reasons of their excessive volatility and unsatisfactory properties of the products resulting from their use in the process of this invention.

The sulfur chloride reactant is either sulfur monochloride ($S_2Cl_2$) or sulfur dichloride ($SCl_2$). The stoichiometry of the reaction involved in this process appears to require at least about one mole but no more than about two moles of the sulfur chloride reactant for each mole of the phosphorus used. If less than this amount of sulfur chloride is used the excess phosphorus will not react. On the other hand, if more than two moles of sulfur chloride is used, the excess of this reactant results merely in sulfurization of the olefin polymer and the product obtained will be unsatisfactory because of high sulfur content and a proportionately dark color.

The relative amounts of the white phosphorus used and the olefin polymer used will vary according to the molecular weight of the polymer and the amount of phosphorus which is desired to be incorporated into the product. Thus, as little as 0.5 mole or as much as 70 moles or even more of the phosphorus may be used for each mole of the polymer used. Ordinarily, the higher the molecular weight of the polymer reactant, the greater the amount of the phosphorus which may be used.

Another embodiment of this invention is the hydrolysis of the phosphorus- and sulfur-containing compositions obtained by the above process and the treatment of the hydrolyzed products with inorganic metal bases to produce either neutral or basic metal salts. The metal salts thus obtained are soluble in hydrocarbon oils and are especially useful as detergent additives in lubricating oils, fuel oils, gasolines, cutting oils, etc. The hydrolysis is usually carried out at temperatures above about 80° C., preferably between 110° C. and 200° C. Steam is preferred for effecting the hydrolysis. The neutralization of the hydrolyzed product may be accomplished simply by mixing it with at least a stoichiometrically equivalent amount of a metal oxide, metal hydroxide, metal carbonate, or a like basic metal compound. When a stoichiometric excess of the metal compound is used, it may be solubilized in the neutralized product and thus provides excess basicity which is often desirable in various applications. The "solubilization" of such excess of the basic metal compound may be facilitated by the use of a promoter compound in the neutralization process. Such promoter compounds are illustrated by phenols such as phenol, alkylphenols, naphthol and alkylnaphthols; or by alcohols such as methanol, butanol, dodecanol, cyclohexanol, benzyl alcohol, etc. A particularly convenient method for preparing basic metal salts of the hydrolyzed phosphorus- and sulfur-containing products involves the use of carbon dioxide to carbonate a basic mixture of such products.

A large number of basic metal compounds are useful as the neutralization agents. For the most part, however, the alkaline earth metal bases such as barium oxide, barium hydroxide, barium sulfide, calcium hydroxide, magnesium methoxide, strontium oxide, etc. are especially preferred because of the particular effectiveness of the neutralized products as detergent additives in hydrocarbon oils.

The process of this invention may be illustrated in greater detail by the following examples:

*Example 1*

To a solution of 600 grams (1.7 moles) of a polyisobutene having a molecular weight of 350 and 25 grams (0.8 mole) of white phosphorus in 600 grams of mineral oil, there is added dropwise 108 grams (0.8 mole) of sulfur monochloride at 25° C. in 1 hour. A slight exothermic reaction occurs and causes the temperature of the mass to reach about 30° C. The mass is then heated at 195° to 200° C. for 4 hours and 1.275 grams of the residue is obtained which has the following analysis:

|  | Percent |
|---|---|
| P | 1.74 |
| S | 3.75 |
| Cl | 0.47 |

*Example 2*

The procedure of Example 1 is repeated except that 0.8 mole of a polyisobutene having a molecular weight of 750 is used (instead of the polyisobutene having a molecular weight of 350). The product has the following analysis:

|  | Percent |
|---|---|
| P | 1.35 |
| S | 3.16 |
| Cl | 0.97 |

*Example 3*

The procedure of Example 1 is repeated except that 0.06 mole of a polyisobutene having a molecular weight of 10,000 is used (instead of the polyisobutene of 350 molecular weight.) The product has the following analysis:

|  | Percent |
|---|---|
| P | 1.79 |
| S | 3.64 |
| Cl | 0.73 |

*Example 4*

The procedure of Example 1 is repeated except that 0.012 of a polyisobutene having a molecular weight of 50,000 is used, instead of the polyisobutene of 350 molecular weight). The product has the following analysis:

|  | Percent |
|---|---|
| P | 2.12 |
| S | 3.78 |
| Cl | 0.93 |

*Example 5*

The procedure of Example 1 is repeated except that 0.6 mole of a polyethylene having a molecular weight of 1,000 is used. The product has the following analysis:

|  | Percent |
|---|---|
| P | 1.71 |
| S | 3.4 |
| Cl | 0.8 |

*Example 6*

The procedure of Example 1 is repeated except that 0.04 mole of a copolymer of 98 parts (by weight) of isobutene with 2 parts of isoprene having a molecular weight of 15,000 is used. The product has the following analysis:

|  | Percent |
|---|---|
| P | 1 |
| S | 2.14 |
| Cl | 0.3 |

*Example 7*

A mixture of 860 grams (1.15 moles) of a polyisobutene having a molecular weight of 750 and 31 grams (1 mole) of white phosphorus is mixed in 860 grams of mineral oil. To this mixture there is added at room temperature 270 grams (2 moles) of sulfur monochloride in 2 hours. The mixture is heated at 160° C. for 4 hours. The residue has the following analysis:

|  | Percent |
|---|---|
| P | 1.5 |
| S | 6.55 |
| Cl | 1.44 |

*Example 8*

The procedure of Example 2 is repeated except that 165 grams (1.6 moles) of sulfur dichloride is used in place of the sulfur monochloride used. The product has the following analysis:

|  | Percent |
|---|---|
| P | 1.9 |
| S | 3.8 |
| Cl | 0.8 |

*Example 9*

The product of Example 7 is hydrolyzed by treatment with steam at 140° to 150° C. for 4 hours and dried. The hydrolyzed product has the following analysis:

| | |
|---|---|
| P _____percent__ | 1.43 |
| S _____do____ | 4.48 |
| Cl _____do____ | 0.4 |
| Acid number _____ | 80 |

*Example 10*

The neutral and basic barium salts of the product of Example 9 are prepared as follows: A mixture of 1,230 grams (1.73 equivalents) of the product of Example 9 and 84 grams of water is prepared, and to this mixture there is added at 70° to 100° C. 145 grams (1.9 equivalents) of barium oxide. The mixture is heated at 100° C. for 1 hour, dried at 150° C. for 1 hour and filtered. The filtrate is the neutral salt. To 1,100 grams (1.13 equivalents) of the above neutral salt there are added at 70° to 100° C. 130 grams (0.68 equivalent) of heptlphenol, 90 grams of water, and 330 grams (4.3 equivalents) of barium oxide. The mixture is heated at 100° to 105° C. for 1 hour and blown with carbon dioxide at 130° to 135° C. for 3 hours. The product is then dried by heating at 175° C. while nitrogen is blown through the mixture and filtered. The filtrate has the following analysis:

| | Percent |
|---|---|
| P _____ | 0.9 |
| S _____ | 1.2 |
| Cl _____ | 0.3 |
| BaSO$_4$ _____ | 34 |

The products obtained by the process of this invention ordinarily are liquids, although as mentioned above, rubbery products are sometimes obtained. The metal salts of the products of the herein described process are useful especially as detergent additives in lubricating oils and fuel oils. In such use as little as 0.1%–5% by weight of the total hydrocarbon oil composition is usually sufficient to achieve the desired results. Also, other commonly used additives such as corrosion-inhibitors, anti-foam agents, extreme-pressure improving agents, viscosity index improving agents, etc. may also be used in conjunction with the detergent additives of this invention in such oil compositions. Specific examples of the utility of the compositions of this invention may be given as follows:

A. Automotive engine crankcase lubricant:

| | Percent |
|---|---|
| SAE 20 base oil _____ | 97.5 |
| Zinc dicyclohexyl phosphoro-dithioate _____ | 1 |
| Product of Example 10 _____ | 1.5 |

B. Insecticidal composition (effective for the control of red spite mites):

| | |
|---|---|
| Water _____ | 98.8 |
| Emulsifier (sodium dodecylsulfonate) _____ | 0.2 |
| Product of Example 1 _____ | 1 |

Other modes of applying the principle of this invention may be employed, change being made as regards the details described provided the features stated in any of the following claims or the equivalent of such be employed.

I therefore particularly point out and distinctly claim as my invention:

1. The process of preparing phosphorus- and sulfur-containing compositions which comprises preparing a mixture of white phosphorus and an aliphatic mono-olefin polymer having a molecular weight of at least about 250 and heating said mixture at a temperature above about 140° C. with from about one to about two moles of a sulfur chloride for each mole of white phosphorus.

2. The process of claim 1 characterized further in that the molecular weight of the aliphatic mono-olefin polymer is within the range of from about 500 to about 50,000.

3. The process of claim 1 characterized further in that the aliphatic mono-olefine polymer is a polymer of isobutene.

4. The process of claim 1 characterized further in that the aliphatic mono-olefin polymer is polyisobutene.

5. The process of preparing phosphorus- and sulfur-containing compositions which comprises preparing a mixture of white phosphorus and an aliphatic polymer of isobutene having a molecular weight of from about 500 to about 3,000, heating said mixture at a temperature of from about 160° C. to about 200° C. with about one mole of sulfur monochloride for each mole of white phosphorus to form a liquid material and treating said liquid material with steam at a temperature within the range of from about 100° C. to about 200° C.

6. The process of claim 5 characterized further in that said steam-treated material is treated with an alkaline earth metal neutralization agent.

7. The product of the process of claim 1.

8. The product of the process of claim 5.

9. The product of the process of claim 6.

References Cited in the file of this patent

UNITED STATES PATENTS 2,380,400     Browning _____ July 31, 1945